(12) United States Patent
Easley et al.

(10) Patent No.: US 11,676,147 B1
(45) Date of Patent: *Jun. 13, 2023

(54) SYSTEMS AND METHODS FOR ACCOUNT OWNERSHIP VERIFICATION

(71) Applicant: United Services Automobile Association (USAA), San Antonio, TX (US)

(72) Inventors: Jeffrey Walton Easley, San Antonio, TX (US); Melanie Lynn Thompson, San Antonio, TX (US); Brian Hurtak, San Antonio, TX (US); Patrick Lugo, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,885

(22) Filed: Mar. 17, 2021

Related U.S. Application Data

(63) Continuation of application No. 15/849,495, filed on Dec. 20, 2017, now Pat. No. 10,990,976.

(51) Int. Cl.
G06Q 20/40 (2012.01)
G06Q 20/02 (2012.01)
G06Q 20/34 (2012.01)
G06Q 20/24 (2012.01)

(52) U.S. Cl.
CPC ......... *G06Q 20/4014* (2013.01); *G06Q 20/02* (2013.01); *G06Q 20/24* (2013.01); *G06Q 20/34* (2013.01); *G06Q 20/4016* (2013.01)

(58) Field of Classification Search
None
See application file for complete search history.

(56) References Cited

U.S. PATENT DOCUMENTS

| 8,121,947 | B1 | 2/2012 | Barth et al. | |
| 8,924,288 | B1* | 12/2014 | Easley | G06Q 30/04 |
| | | | | 705/40 |
| 10,346,839 | B2* | 7/2019 | Ovick | G06F 16/283 |
| 10,990,976 | B1 | 4/2021 | Easley et al. | |
| 2003/0083992 | A1 | 5/2003 | Chang | |
| 2005/0097049 | A1* | 5/2005 | Writer | G06Q 20/00 |
| | | | | 705/44 |
| 2007/0061254 | A1 | 3/2007 | Blunck et al. | |
| 2008/0091591 | A1* | 4/2008 | Egnatios | G06Q 20/10 |
| | | | | 705/38 |
| 2009/0292641 | A1* | 11/2009 | Weiss | G06F 21/32 |
| | | | | 705/72 |
| 2013/0325599 | A1 | 12/2013 | Yeri et al. | |
| 2015/0134524 | A1 | 5/2015 | Kaufman et al. | |

(Continued)

*Primary Examiner* — Bruce I Ebersman
*Assistant Examiner* — Matthew Cobb
(74) *Attorney, Agent, or Firm* — Perkins Coie LLP

(57) ABSTRACT

Embodiments described herein disclose methods and systems for authenticating ownership of an account in real-time or near real-time so that a user can fund or open a new account without waiting for several days. The system enables an operator to select one or more methods for authentication from a group of candidate schemes. The candidate schemes include (1) a card-association-network scheme; (2) an account-aggregation scheme; and (3) a credit-bureau-integration scheme.

20 Claims, 5 Drawing Sheets

(56) References Cited

U.S. PATENT DOCUMENTS

| | | | |
|---|---|---|---|
| 2016/0125412 A1* | 5/2016 | Cannon | G06Q 20/4014 705/44 |
| 2017/0317997 A1* | 11/2017 | Smith | G06Q 20/3829 |
| 2019/0213311 A1* | 7/2019 | Tussy | G06Q 20/3276 |

* cited by examiner

SYSTEMS AND METHODS FOR ACCOUNT OWNERSHIP VERIFICATION

CROSS-REFERENCE TO RELATED APPLICATIONS

This application is a continuation of U.S. patent application Ser. No. 15/849,495 filed Dec. 20, 2017, now allowed, entitled "SYSTEMS AND METHODS FOR ACCOUNT OWNERSHIP VERIFICATION," which is hereby incorporated by reference in its entirety for all purposes.

BACKGROUND

Authenticating a user is an important measure for financial institutions to take to properly manage risks for many transactions. Authentication is of particular importance when a customer opens a new financial account because the customer is typically required to fund the new account. If the customer is funding the account with funds from an account held outside of the financial institution, financial institutions ensure that the customer is authorized to withdraw the funds. Thus, prior to funding and/or opening an account, financial institutions typically verify that the customer has access to (e.g., ownership of) an existing account. Traditionally, to verify the ownership of an existing account, the financial institution deposits a small amount of money (e.g., $0.01 or $0.02) in the existing account. The deposit typically takes two to three business days, which could be three to five days. Then, the customer is required to log into the account to verify the exact amount that was deposited. If the customer can verify the amount of the deposited money, the account ownership is verified and the financial institution allows the account to be funded and the account to be operable. This traditional approach is time-consuming, inefficient, and inconvenient for customers because it takes several days, requires the user to remember to check their account several days after requesting the new account, login to the outside account and provide the information to the financial institution. Therefore, it is advantageous to have an improved system and method to address the foregoing issue.

Figure 1:
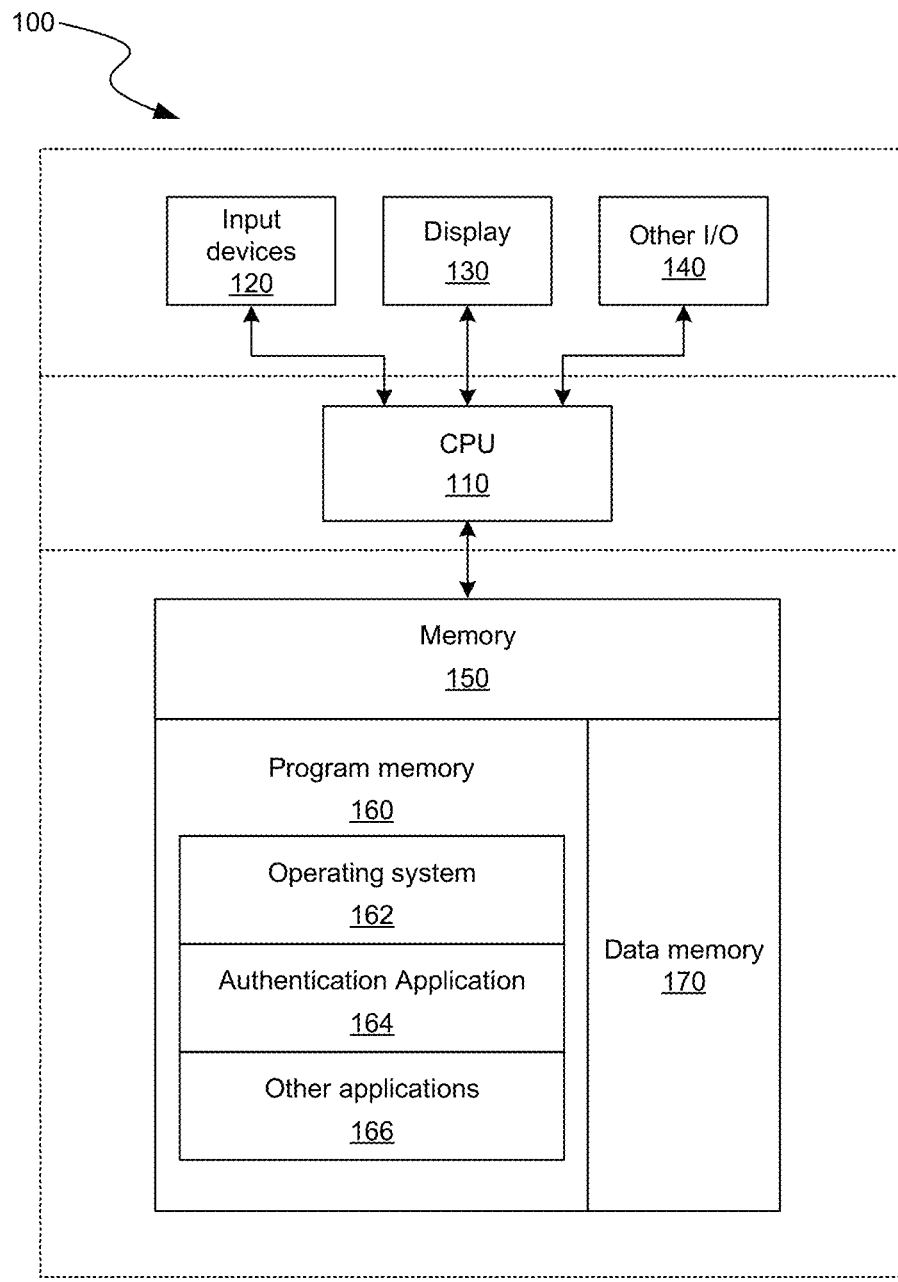
FIG. 1 is a block diagram illustrating an overview of devices on which some implementations can operate.

The techniques introduced herein may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments for authenticating a user in a real-time or near real-time manner are disclosed. More specifically, embodiments for verifying bank account ownership are disclosed. When the user requests the opening of a new financial account (e.g., a bank account, a financial service account, etc.), a financial institution (e.g., a bank, a financial service provider, etc.), the user is typically required to fund the new account. The financial institution opening the new account verifies that the user is authorized to access the funds. As described above, the previous process to verify the bank account took several days and required the user to log into his or her bank account. Methods, apparatuses, and systems described herein enable the financial institution to effectively verify that the user is authorized to withdraw funds from the account and thus allows the account to be funded and/or opened in a real-time or near real-time manner without undue delay, which is convenient and beneficial to both the financial institution and the user. The disclosed technology can be used to verify that a user owns or is authorized to withdraw funds from an account and also can be used to authenticate the user for other purposes.

The present disclosure enables an operator to select one or more schemes or processes for authentication. The operator can elect to perform multiple authentication schemes in parallel if the operator wants to have a higher degree of security. The present disclosure provides a group of candidate schemes from which the operator can choose. In some embodiments, the candidate schemes can include (1) a card-association-network scheme; (2) an account-aggregation scheme; and (3) a credit-bureau-integration scheme.

For the card-association-network scheme, the system uses an existing, secured network associated with a financial institution (e.g., a credit card organization such as Visa) to quickly authenticate the user. For example, the system can use an existing credit card payment network to authenticate the user. If the user holds a valid credit card, the system can initiate a real-time or near real-time non-monetary transaction (e.g., a pending payment request for "zero" dollars) and then transmit (or request the credit card organization transmit), a code or token (e.g., a description, text, numerical numbers, symbols, combinations thereof, etc.) to the user via the card payment network. The user can then have immediate access to the code or token via the user's outside (e.g., the user can receive a notification from the credit card organization, stating "Payment pending, $0, code: 1234$xyz"). The code or token can be "deposited" in the user's outside held account, accessed via a mobile application on the user's mobile device, sent to the user's mobile device (e.g., push notification, text message, phone call), or otherwise provided to the user. The user can then provide the received code or token ("1234$xyz") to the system for authentication. If the provided code matches the code previously sent by the system, then the user is authenticated.

In some embodiments, the credit card organization can send a small amount of money to the user's outside held bank account instantaneously. Because the credit card payment network is being used rather than the ACH network, the payment will be deposited immediately. The user can look at their outside held bank account to verify the amount to prove ownership of the outside held account without having to wait for several days for the payment to be deposited into the user's outside held bank account. Thus, using this scheme, a bank account can be funded and/or opened when the user requests the new account instead of waiting for several days.

The account-aggregation scheme utilizes the user's existing account information to authenticate the user. The user first provides credentials for an existing account (e.g., a bank account number, an account name, a branch name, etc.) at a different service provider (e.g., a bank other than the one where the user is currently seeking to open a new account). By providing such credentials, the user authorizes the system to access the user's existing account information for authentication. For example, such authentication can be done when the user requests to sign up for a financial service (e.g., when a user downloads an app for financial services and agrees to related terms), prior to the user's request for opening a new account. Based on the provided credentials, the system can access the user's existing account information at the service provider. The system then compares the existing account information with new account information provided by the user to authenticate the user. For example, the system can verify whether the provided account name/number/branch information matches what the system retrieves from the service provider. If there is a match, the user can be authenticated.

In some embodiments, the system can login to the existing account and collect information such as other authorized users of the account, year the account was created, related accounts, estimate of amount of funds in the account, and other information regarding the account. The user can be asked in real-time or near real-time to answer questions relating to the existing account. The user can be asked via a computing device and can be given a series of questions with multiple choice answers regarding the account.

As for the credit-bureau-integration scheme, the system can use real-time or near real-time information (e.g., a credit report) received from a credit bureau (e.g., a credit union, a credit rating organization, etc.) to authenticate the user. Based on the information provided by the user when requesting to open a new account (e.g., a social security number, an identification number, personal addresses, etc.), the system can request and then receive a credit report for the user from the credit bureau. The system can then analyze the credit report and compare the information therein with the new account information provided by the user. If the two sets of information match each other, the user is then authenticated.

The methods for authentication discussed herein include, inter alia, (1) receiving an informational record (e.g., existing account information, personal information, information provided by the user for a new account, etc.) associated with a user; (2) selecting an authentication scheme from a group of candidate schemes based on the informational record (e.g., the selection can be based on availability, confidence levels for the schemes, user preferences, etc.); (3) determining a source of verification based on the selected authentication scheme; (4) receiving reference information (e.g., existing account information, credit reports, a code or token embedded in a pending credit payment request, etc.) from the source of verification via a secured network associated with the source of verification (e.g., a credit card network, a secured network used and managed by a financial institution such as a bank, etc.); (5) generating an inquiry based on the reference information (e.g., "What is the code shown in the payment request notification at 10:15 a.m. Oct. 30, 2017 from Credit Card numbered XXXX?" "What is your favorite color?" "Which city were you born at?" "When was the last time you requested a credit report from Credit Agency Y?" etc.); (6) transmitting the inquiry to the user via the secured network; (7) receiving an inquiry response from the user; (8) comparing the inquiry response with the reference information to generate a comparison result; and (9) authenticating the user based on the comparison result.

In some embodiments, the group of candidate schemes can include the card-association-network scheme, the account-aggregation scheme, and the credit-bureau-integration scheme as discussed above. In other embodiments, however, the group of candidate schemes can include other suitable schemes or processes that can be implemented or performed in a real-time or near real-time manner.

In some embodiments, the informational record includes user's credit card numbers, user account information (e.g., bank accounts), user credit information (e.g., credit history), user's social security numbers, etc. In some embodiments, the source of verification includes a credit card database, a user account database, a credit-bureau database, etc. The source of verification can include, or have access to, multiple search servers (e.g., a server that can search a user's prior criminal history) or databases (e.g., a database storing credit or bank account information).

In some embodiments, the reference information includes a token or a code. The token is accessible by the user via the secured network, and the inquiry includes requesting the user to provide information associated with the token. For example, the system can directly ask the user what the token is. As another example, the token can include one or more questions associated with the user, and the system can ask the user to answer such questions.

In some embodiments, the reference information can include a description or text. The description is also accessible by the user via the secured network. In such embodiments, the inquiry can include requesting the user to provide information associated with the description. For example, the system can directly ask the user to provide the description. As another example, the description can include one or more questions associated with the user, and the system can ask the user to answer such questions.

In some embodiments, the reference information can include an image. The image is also accessible by the user via the secured network. In such embodiments, the inquiry can include requesting the user to provide information associated with the image. For example, the system can ask the user what is shown in the image. As another example, the system can ask the user the color of the image (or other characteristics of the image, in other embodiments).

In some embodiments, a card connected to a funding account can be used in authenticating the user. For example, in some embodiments, when the user asks to open an account at a bank and to fund the account with funds held at a different institution connected to a payment card (e.g., debit card), the bank can ask the user to provide information about the transaction history of the card/account (e.g., the last three purchases made on the payment card (and/or account)). Meanwhile, the bank can use the user's credentials to access the payment card (and/or account) to check the transaction history to compare to the user's answers. In some embodiments, the bank can request the user to provide transaction history (e.g., last purchase) of a payment card at a certain merchant (e.g., Amazon). The bank can request the transaction history from the bank or directly from the merchant and compare the user's answer. In some embodiments, the bank can ask the user to verify a number of places where the payment card or account is on file.

The system of the present disclosure includes, for example, (A) a processor; and (B) a memory having instructions stored thereon that, when executed by the processor, cause a machine to: (i) receive an informational record associated with a user; (ii) select an authentication scheme from a group of candidate schemes based on the informational record; (iii) determine a source of verification based on the selected authentication scheme; (iv) receive reference information from the source of verification via a secured network associated with the source of verification; (v) generate an inquiry based on the reference information; (vi) transmit the inquiry to the user via the secured network; (vii) receive an inquiry response from the user; (viii) compare the inquiry response with the reference information to generate a comparison result; and (ix) authenticate the user based on the comparison result.

This disclosure describes systems and methods designed to authenticate a user in a real-time or near real-time manner. Various embodiments may provide one or more of the following technological improvements: (1) efficient real-time or near real-time user authentication by providing multiple schemes for an operator to choose from; (2) ability to effectively authenticate users without interfering with common financial practices, (3) ability to enable the operator to select desirable security level by allowing the operator to perform multiple authentication schemes in parallel; and (4) ability to provide enhanced user experiences by offering immediate authentication results (e.g., and an opportunity to cure a mistake made by the user when providing information) to the operator and the user requesting a new account.

In the following description, for the purposes of explanation, numerous specific details are set forth in order to provide a thorough understanding of embodiments of the present technology. It will be apparent, however, that embodiments of the present technology may be practiced without some of these specific details.

Suitable Systems and Devices

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that authenticate a user. In some embodiments, the device 100 can be implemented as a mobile device, a portable computer, a desktop computer, a kiosk, a wearable device, and/or other suitable devices. The device 100 can include one or more input devices 120 that provide input to the CPU (processor) 110, notifying it of actions. The actions are typically mediated by a hardware controller that interprets the signals received from the input device 120 and communicates the information to the CPU 110 using a communication protocol. The input devices 120 include, for example, a mouse, a keyboard, a touchscreen, an infrared sensor, a motion sensor, a touchpad, a wearable input device, a camera- or image-based input device, a microphone, a biometric input device (e.g., a fingerprint reader, an iris recognition device, a retina scanner, etc.), or other user input devices.

In some embodiments, the CPU 110 can be a single processing unit or multiple processing units in a device or distributed across multiple devices. The CPU 110 can be coupled to other hardware devices, for example, with the use of a bus, such as a PCI bus or SCSI bus. The CPU 110 can communicate with a hardware controller for devices, such as for a display 130. The display 130 can be used to visually present information such as text and/or graphics. In some examples, the display 130 provides graphical and textual visual feedback to a user. In some implementations, the input device 120 can be formed as part of the display 130. For example, the input device 120 can be a touchscreen, which is part of the display 130. In some implementations, the display 130 is separate from the input device 120. Examples of the display devices include (1) an LCD display; (2) an LED display; (3) a projected, holographic, or augmented reality display (such as a heads-up display device or a head-mounted device); and so on. Other I/O devices 140 can also be coupled to the CPU 110. Embodiments of the other I/O devices 140 include a network card, video card, audio card, USB, FireWire or other external device, camera, printer, speakers, CD-ROM drive, DVD drive, disk drive, or Blu-Ray device.

In some implementations, the device 100 can include a communication device (or component) capable of communicating wirelessly or wire-based with a network node. The communication device can communicate with another device or a server through a network using, for example, TCP/IP protocols. The device 100 can utilize the communication device to distribute operations across multiple network devices.

The CPU 110 can have access to a memory 150. In some embodiments, the memory 150 includes one or more of various hardware devices for volatile and non-volatile storage, and can include both read-only and writable memory. For example, the memory 150 can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. The memory 150 is not a propagating signal divorced from underlying hardware and accordingly is non-transitory. The memory 150 can include a program memory 160 that stores programs and software, such as an operating system 162, an authentication application 164, and other application programs 166. The memory 150 can also include a data memory 170 that can include authentication information, such as information associated with existing financial account, information associated with existing credit cards, information associated with user's personal information, tokens/codes, information associated with user's credit histories, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
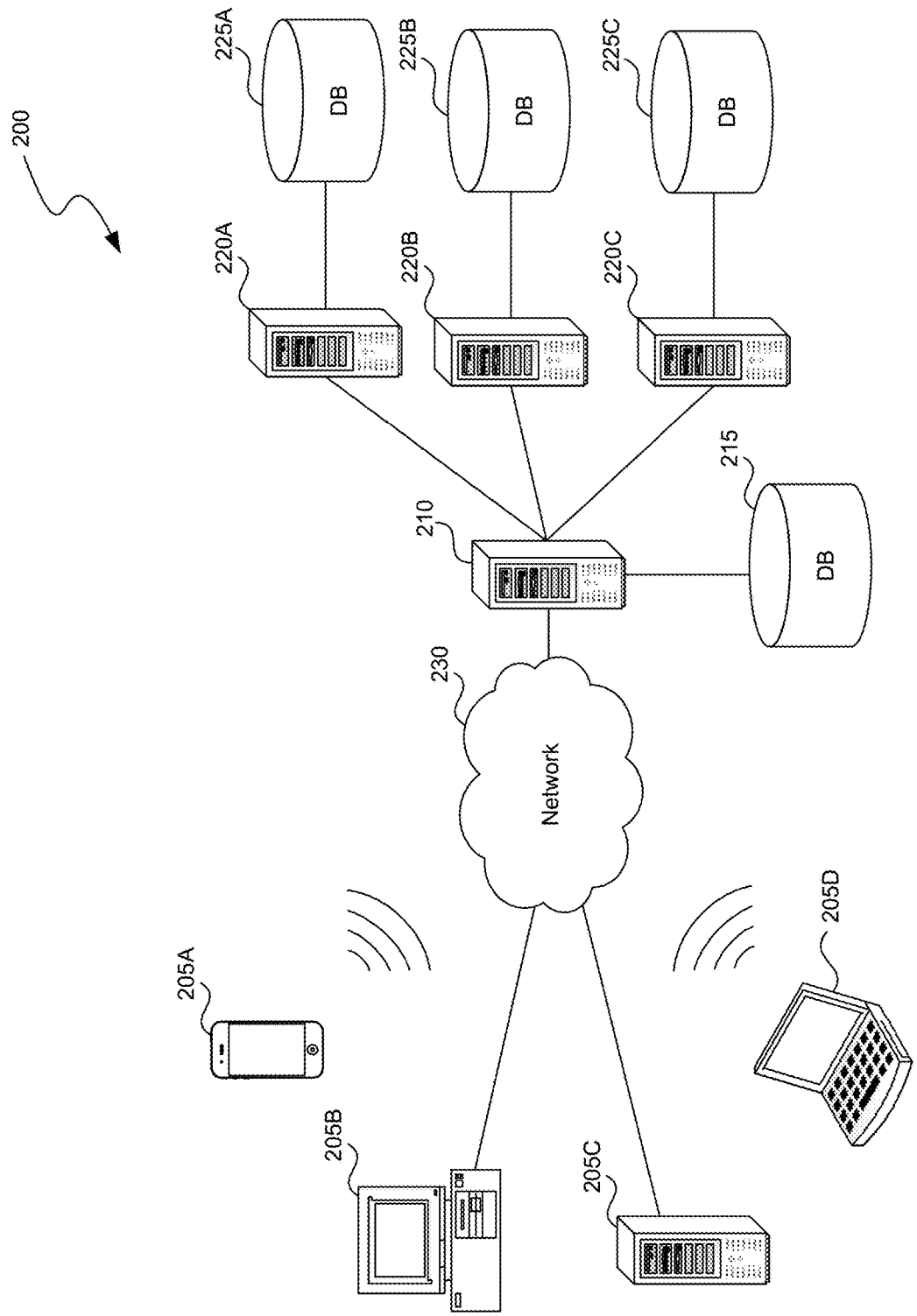
FIG. 2 is a block diagram illustrating an overview of an environment in which some implementations can operate.

FIG. 2 is a block diagram illustrating an overview of an environment 200 in which some implementations of the disclosed technology can operate. As shown, the environment 200 includes one or more client computing devices 205A-D, examples of which can include the device 100. The client computing devices 205A-D can operate in a networked environment using logical connections through a network 230 to one or more remote computers, such as a server computing device 210.

In some implementations, the server computing device 210 can be an edge server that receives client requests and coordinates fulfillment of those requests through other servers, such as servers 220A-C. The server computing device 210 and 220A-C can comprise computing systems, such as the device 100. Though each of the server computing device 210 and servers 220A-C is displayed logically as a single server, the server computing device 210 and the servers 220A-C can each be a distributed computing environment encompassing multiple computing devices located at the same or at geographically disparate physical locations. In some implementations, each of the servers 220A-C can further correspond to a group of servers.

The client computing devices 205A-D, the server computing device 210, and the servers 220A-C can each act as a server or client to other server/client devices. As shown, the server computing device 210 can connect to a database 215. The servers 220A-C can each connect to one of corresponding databases 225A-C. As discussed above, each of the servers 220A-C can correspond to a group of servers, and each of these servers can share a database or can have its own database. The databases 215, 225A-C can warehouse (e.g., store) information associated with the present disclosure (e.g., account information, account credentials, user personal information, credit card information, credit histories, token/codes, questions/answers, etc.). Though the databases 215, 225A-C are displayed logically as single units, the databases 215, 225A-C can each be a distributed computing environment encompassing multiple computing devices, can be located within its corresponding server, or can be located at the same or at geographically disparate physical locations.

The network 230 can be a local area network (LAN) or a wide area network (WAN), but it can also be other wired or wireless networks. The network 230 may be the Internet or some other public or private network. The client computing devices 205A-D can be connected to the network 230 through a network interface, such as by wired or wireless communication. While the connections between the server computing device 210 and the servers 220A-C are shown as separate connections, these connections can be any kind of local, wide area, wired, or wireless network, including the network 230 or a separate public or private network. In some embodiments, the network 230 includes a secured network that is used by a financial institution (e.g., a bank, a credit card organization, a credit report organization, etc.).

Figure 3:
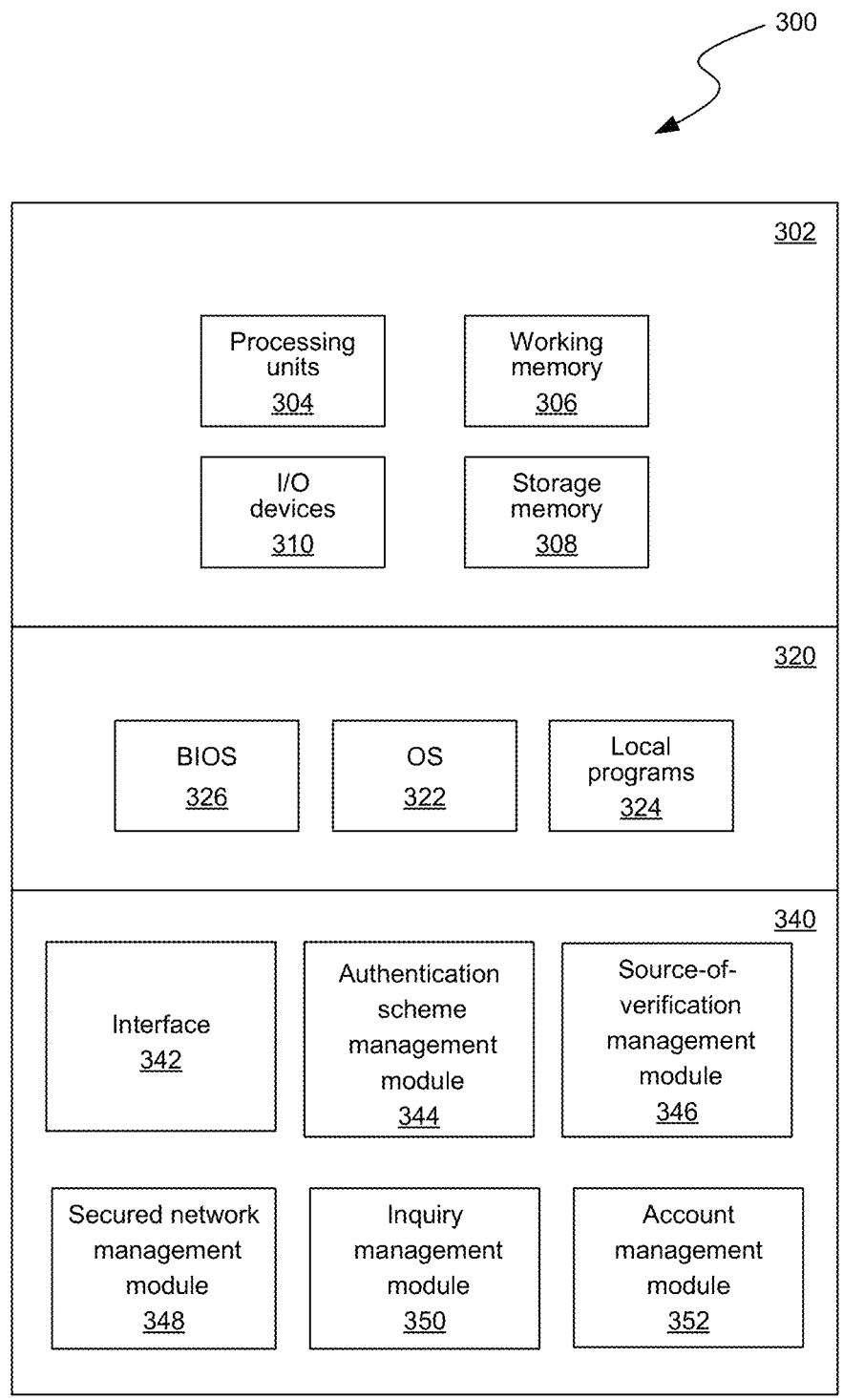
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), a working memory 306, a storage memory 308, and input and output devices 310. The components 300 can be implemented in a client computing device such as the client computing devices 205A-D or on a server computing device, such as the server computing device 210 (or the servers 220A-C).

The general software 320 can include various applications, including an operating system 322, local programs 324, and a basic input output system (BIOS) 326. The specialized components 340 can be subcomponents of a general software application 320, such as local programs 324. The specialized components 340 can include an authentication scheme management module 344, a source-of-verification management module 346, a secured network management module 348, an inquiry management module 350, an account management module 352, and components that can be used for transferring data and controlling the specialized components 340, such as an interface 342. In some implementations, the components 300 can be in a computing system that is distributed across multiple computing devices or can be an interface to a server-based application executing one or more of the specialized components 340.

In some embodiments, the authentication scheme management module 344 is configured to manage a group of candidate schemes from which an operator can choose one or more authentication schemes to authenticate a user who requests to open a new financial account. In some embodiments, the group of candidate schemes includes one or more credit-card-based schemes, one or more account-based schemes, and/or one or more credit-bureau-based schemes. In some embodiments, the present technology enables the operator to customize an authentication scheme based at least in part on available networks, reference information, information from the user, and databases.

In some embodiments, the operator can select to use a credit card payment network to authenticate the user, with a token associated with a user's account information. In such embodiments, for example, the user can receive a notification from the user's credit card organization, stating "Payment $0 pending; Token: account number in Bank XYZ" in the user's bank account, mobile device, mobile application, etc. To correctly respond, the user needs to provide his/her account number at Bank XYZ, which the present technology has access to (e.g., stored in a local database or accessible via a secured network). The present technology can then authenticate the user based on the user's response. In some embodiments, the operator can use a secured bank network to authenticate a user by transmitting/receiving reference information from a credit-bureau database. The present technology enables the operator to choose multiple sources of verification via one or more secured networks in a real-time or near real-time manner, such that the operator can have immediate authentication results, while maintaining desirable security level.

The source-of-verification management module 346 is configured to manage the sources of verification (e.g., the databases 215, 225A-C shown in FIG. 2). The present technology can periodically verify the correctness, availability, and integrity of the information stored in the sources of verification based on (1) user feedback; (2) comparing the information stored in the sources of verification with outside reference information; and/or (3) cross-referencing the information stored in the sources of verification. By this arrangement, the source-of-verification management module 346 can provide reliable reference information for the systems to authenticate users.

The secured network management module 348 is configured to manage available secured networks (e.g., the network 230 shown in FIG. 2) that the system can use to authenticate users. The present technology can periodically verify the availability, security, or communication speed/quality/rate of the networks. In some embodiments, the secured network management module 348 can also use additional mechanisms (e.g., to use an encryption process, to add extra security token, etc.) to enhance the security level of the available networks.

The inquiry management module 350 is configured to generate inquiries and to manage the information related to the inquiries generated by the system. For example, the inquiry management module 350 can store all the inquiries that have been generated and sent to a user. The inquiry management module 350 can also track whether the user correctly responded to these inquiries. For example, the inquiry management module 350 can identify that there have been 10 inquiries sent to User A in the past month to which nine of the 10 inquiries were not correctly responded. In such embodiments, the inquiry management module 350 can red-flag the activities associated with User A (e.g., activities from a device or a network address associated with User A) as suspicious activities.

In some embodiments, the inquiry management module 350 can generate new inquiries based on prior inquiries. For example, a new inquiry can be "Please identify from the list below the inquiry sent to you yesterday," "When was the last time you received an inquiry from the system," or other suitable questions. By this arrangement, the inquiry management module 350 can enhance overall security by identifying suspicious activities based on analyzing the inquiries generated and managed by the inquiry management module 350.

The account management module 352 is configured to manage account information associated with a user. For example, the account management module 352 can receive all available information associated with the user and store it in a secured database. In some embodiments, when the system wants to authenticate the user, the system can pull reference information from the database maintained by the account management module 352 (rather than from remote databases via a network). In some embodiments, the system can receive two sets of reference information: one from the account management module 352 and the other from a database via a secured network. The system can then compare the two sets of reference information to make sure the reference information is correct and trustworthy. In some embodiments, the account management module 352 can also act as a backup source of verification when the network connection is interrupted or somewhat not available.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, and other logic may be included, etc. In some implementations, one or more of the components described above can execute one or more of the processes described below.

Figure 4:
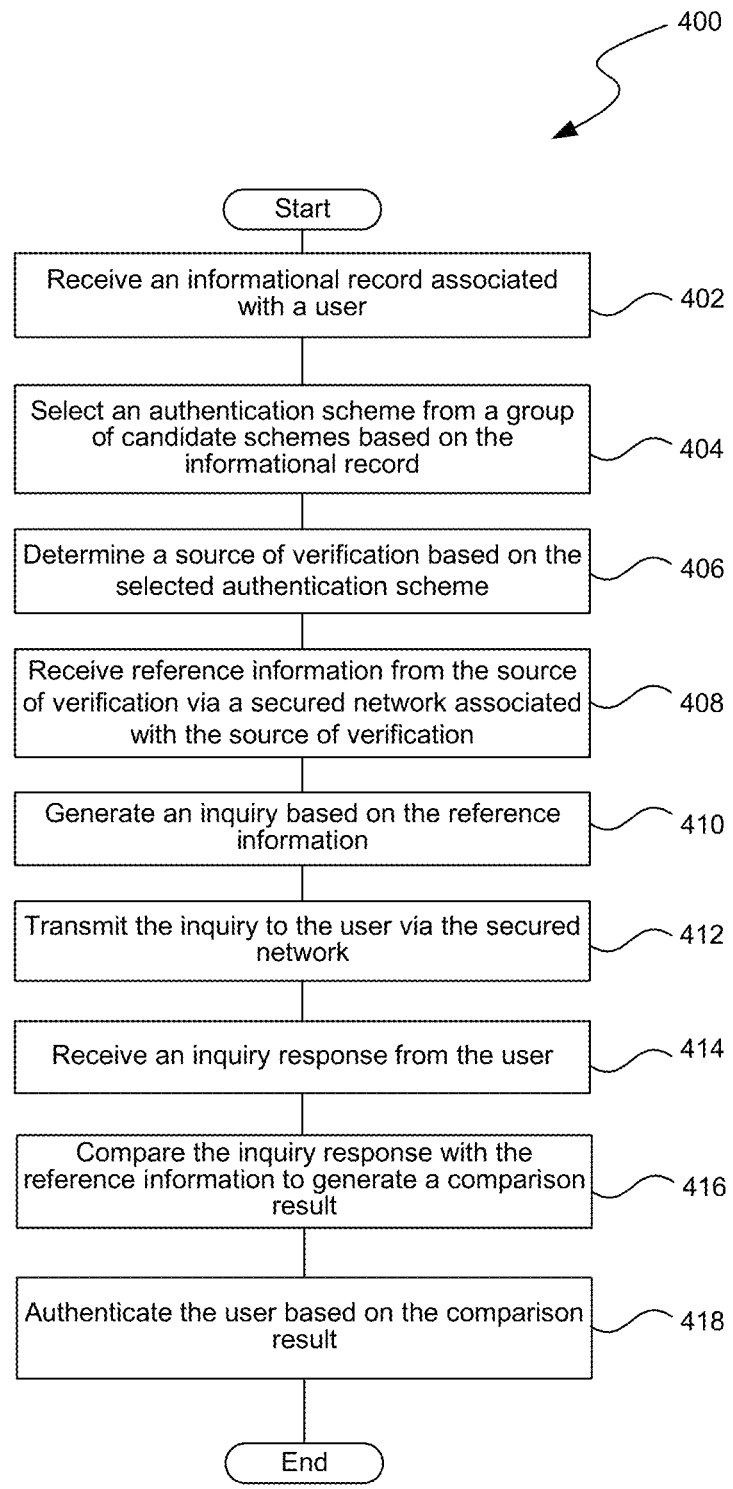
FIG. 4 is a flow diagram illustrating a process in accordance with embodiments of the present disclosure.

FIG. 4 is a flow diagram illustrating a set of operations 400 for authenticating a user in a real-time or near real-time manner. The operations 400 can be implemented by a computing device (e.g., the device 100, the client computing devices 205A-D, the server computing device 210, the servers 220A-C, etc.).

In operation 402, the computing device receives an informational record associated with a user. In some embodiments, the informational record can be received from a user input. In some embodiments, the informational record can be from a database accessible by the computing device (e.g., the database maintained by the account management module 352, databases 215, 225A-C, etc.).

Based on the received information record, the computing device, in operation 404, proceeds to select an authentication scheme from a group of candidate schemes. In some embodiments, the group of candidate schemes is maintained by a particular module such as the authentication scheme management module. In some embodiments, the computing device can provide recommendations regarding which authentication scheme to use.

In operation 406, based on the selected authentication scheme, the computing device then determines a source of verification that can be used to authenticate the user. In some embodiments, multiple sources of verification can be identified and selected. In some embodiments, the source of verification can be determined based on prior transaction history, data quality, user preferences, and/or other suitable factors.

The computing device continues, in operation 408, to receive reference information from the determined source(s) of verification via a secured network associated with the source(s) of verification. For example, the secured network can include a credit card payment network, a bank network, a private network, etc.

In operation 410, an inquiry is generated based on the reference information. In operation 412, the generated inquiry is transmitted to the user. In some embodiments, the inquiry is selected from a list of candidate questions. The list of candidate questions can be maintained by an inquiry management module (e.g., the inquiry management module 350 shown in FIG. 3). In some embodiments, the computing device can generate two or more inquiries and send them to the user. In some embodiments, the number of inquiries can be determined based on desirable security levels (e.g., sending more inquires when requiring a higher security level). In some embodiments, the inquiries can be determined based on whether the user has previously responded to an inquiry. For example, the computing device can avoid sending repeating inquiries to the user. As another example, if a user fails to correctly respond to an inquiry but that user is eventually authenticated (e.g., by correctly responding to another inquiry), the inquiry will be reviewed to make sure that inquiry is a suitable one to authenticate users.

In operation 414, the computing device receives an inquiry response from the user, and in operation 416, the inquiry response is compared with the reference information to see if there is a match. In some embodiments, the computing device can determine that the authentication process fails if there is no match. In such case, the operations 400 end at operation 416. In some embodiments, the computing device can further notify the operator of the failure of the authentication process.

In some embodiments, the computing device can give the user a "second chance" by sending the user a second inquiry after the user fails to correctly respond to the first inquiry. For example, in such embodiments, the second inquiry can be more difficult or complex. In some embodiments, if the user has failed to correctly respond to a threshold number of inquiries (e.g., 3-5 inquiries), the computing device can stop the authentication process and report to the operator that a suspicious activity has been identified.

In operation 418, based on the result of the comparison performed by operation 416 (e.g., if there is a match), the computing device can authenticate the user and accordingly enables the user to immediately fund and/or open a new financial account, as requested by the user. The present technology provides an effective and efficient way to authenticate a user in a real-time or near real-time manner, which enables the user to fund and/or open a new financial account without undue delay.

Figure 5:
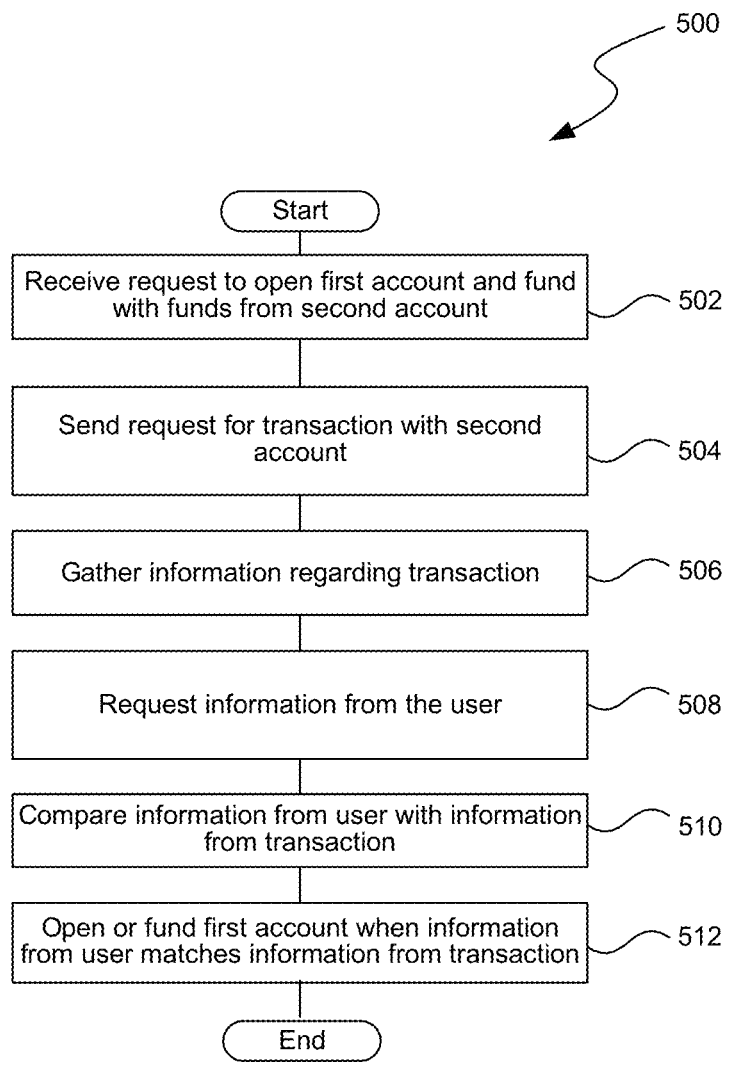
FIG. 5 is a flow diagram illustrating a process in accordance with embodiments of the present disclosure.

FIG. 5 is a flow diagram illustrating a set of operations 500 for verifying bank account ownership in a real-time or near real-time manner. Receiving operation 502 receives a request to open a first bank account and fund the first bank account with funds from a second bank account that is held at a different financial institution than the first bank account. The request can be received via a first network. Sending operation 504 sends a request to a third party for a transaction to be made with the second account. The transaction can be a deposit of funds, a code, a token, a message, a description, an image, or other identifier. The request can be made via a second network (e.g., payment card network). Gathering operation 506 gathers information about the transaction. The system can gather the information by using credentials to log into the second account or by requesting the transaction details from the third party. In some embodiments, in the request for the transaction, the system specifies the parameters of the transaction such that gathering operation 506 is not needed.

Requesting operation 508 requests information from the user regarding the transaction. The user can obtain the information by reviewing the second account, thus proving that the user has access to the second account. Upon receipt of a response for the information from the user, comparing operation 510 compares the information from the user's response with the information regarding the transaction. Opening operation 512 opens and/or funds the first account when information from the user's response matches the information from the transaction.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. The phrase "real-time" means instantaneously or near instantaneously (i.e., within milliseconds) and "near real-time" means within a few hours.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples. Alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computerized real-time authentication method, performed using one or more processors, the method comprising:
   receiving, by the one or more processors, an informational record associated with a user having a first account at a first financial institution to open a second account at a second financial institution funded with funds from the first account;
   performing, by the one or more processors, a first authentication scheme and a second authentication scheme in parallel to authenticate the user to open the second account at the second financial institution,
      wherein performing the first authentication scheme includes:
         determining, by the one or more processors, a third account associated with the user based on the first authentication scheme;
         initiating, by the one or more processors, a non-monetary transaction to be made with the third account;
         transmitting, by the one or more processors, an inquiry to the user to provide one or more characteristics of the non-monetary transaction in the third account; and
         receiving, by the one or more processors, from the user at least one characteristic of the non-monetary transaction in the third account;
      wherein performing the second authentication scheme includes:
         receiving, by the one or more processors, at least one credential of the user to access the first account; and
         accessing, by the one or more processors, the first account with the at least one credential of the user to verify account information of the first account matches the received informational record; and
      in response to A) receiving the at least one characteristic of the non-monetary transaction and B) the account information of the first account matching the received informational record, authenticating, by the one or more processors, the user in real-time to open the second account at the second financial institution.

2. The computerized real-time authentication method of claim 1, wherein the first authentication scheme includes a card-association-network scheme, and wherein the second authentication scheme includes an account-aggregation scheme.

3. The computerized real-time authentication method of claim 2,
   wherein the informational record includes a credit card number associated with the user.

4. The computerized real-time authentication method of claim 2,
   wherein the informational record includes a user account information of an account associated with the user.

5. The computerized real-time authentication method of claim 2,
   wherein the informational record includes a user credit information.

6. The computerized real-time authentication method of claim 1,
   wherein the one or more characteristics of the non-monetary transaction includes a description.

7. The computerized real-time authentication method of claim 1,
   wherein the one or more characteristics of the non-monetary transaction includes an image.

8. A non-transitory computer-readable storage medium storing instructions that, when executed by a computing system, cause the computing system to perform a process for real-time authentication, the process comprising:
   receiving an informational record associated with a user having a first account at a first financial institution to open a second account at a second financial institution funded with funds from the first account;
   performing a first authentication scheme and a second authentication scheme in parallel to authenticate the user to open the second account at the second financial institution;
      wherein performing the first authentication scheme includes:
         determining a third account associated with the user based on the first authentication scheme;
         initiating a non-monetary transaction to be made with the third account;
         transmitting an inquiry to the user to provide one or more characteristics of the non-monetary transaction in the third account; and
         receiving from the user at least one characteristic of the non-monetary transaction in the third account;
      wherein performing the second authentication scheme includes:
         receiving at least one credential of the user to access the first account; and
         accessing the first account with the at least one credential of the user to verify account information of the first account matches the received informational record; and
      in response to A) receiving the at least one characteristic of the non-monetary transaction and B) the account information of the first account matching the received informational record, authenticating the user in real-time to open the second account at the second financial institution.

9. The non-transitory computer-readable storage medium of claim 8, wherein the first authentication scheme includes a card-association-network scheme, and wherein the second authentication scheme includes an account-aggregation scheme.

10. The non-transitory computer-readable storage medium of claim 9,
    wherein the informational record includes a credit card number associated with the user.

11. The non-transitory computer-readable storage medium of claim 9,
    wherein the informational record includes a user account information of an account associated with the user.

12. The non-transitory computer-readable storage medium of claim 9,
wherein the informational record includes a user credit information.

13. The non-transitory computer-readable storage medium of claim 8,
wherein the one or more characteristics of the non-monetary transaction includes a description.

14. The non-transitory computer-readable storage medium of claim 8,
wherein the one or more characteristics of the non-monetary transaction includes an image.

15. A computing system comprising:
one or more processors; and
one or more memories storing instructions that, when executed by the one or more processors, cause the computing system to perform a process comprising:
receiving an informational record associated with a user having a first account at a first financial institution to open a second account at a second financial institution funded with funds from the first account;
performing a first authentication scheme and a second authentication scheme in parallel to authenticate the user to open the second account at the second financial institution;
wherein performing the first authentication scheme includes:
determining a third account associated with the user based on the first authentication scheme;
initiating a non-monetary transaction to be made with the third account;
transmitting an inquiry to the user to provide one or more characteristics of the non-monetary transaction in the third account; and
receiving from the user at least one characteristic of the non-monetary transaction in the third account;
wherein performing the second authentication scheme includes:
receiving at least one credential of the user to access the first account; and
accessing the first account with the at least one credential of the user to verify account information of the first account matches the received informational record; and
in response to A) receiving the at least one characteristic of the non-monetary transaction and B) the account information of the first account matching the received informational record, authenticating the user in real-time based on the comparison result to open the second account at the second financial institution.

16. The computing system according to claim 15, wherein the first authentication scheme includes a card-association-network scheme, and wherein the second authentication scheme includes an account-aggregation scheme.

17. The computing system according to claim 16,
wherein the informational record includes a credit card number associated with the user.

18. The computing system according to claim 16,
wherein the informational record includes a user account information of an account associated with the user.

19. The computing system according to claim 16,
wherein the informational record includes a user credit information.

20. The computing system according to claim 15,
wherein the one or more characteristics of the non-monetary transaction includes a description.

\* \* \* \* \*